C. GARDINER.
CLEANER FOR WIND SHIELDS FOR AUTOMOBILES, TROLLEY CARS, AND THE LIKE.
APPLICATION FILED DEC. 30, 1909.
978,013.  Patented Dec. 6, 1910.
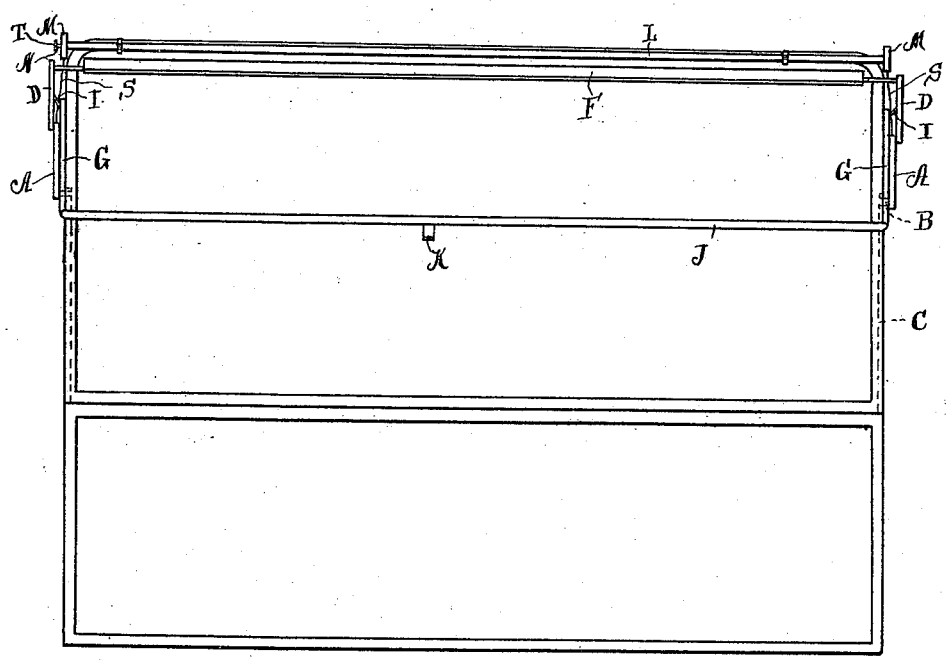
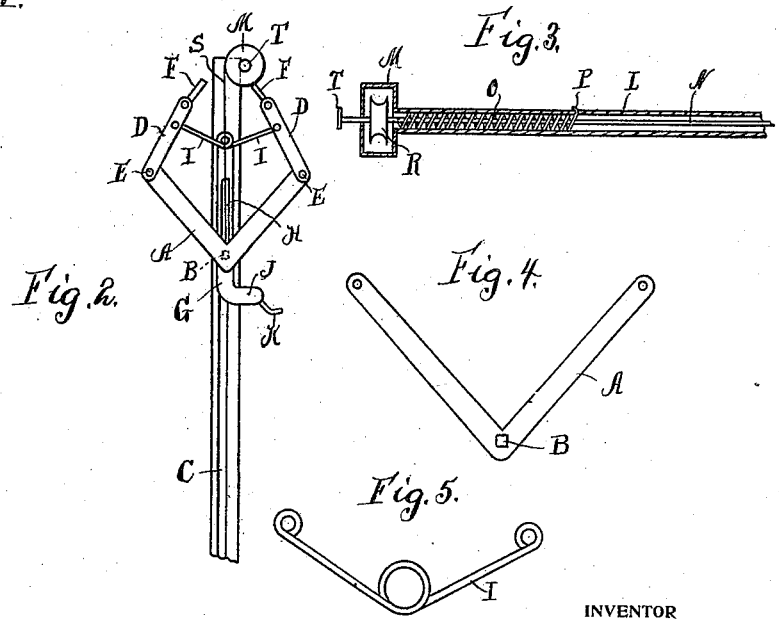
WITNESSES
W. W. Williamson
S. M. Gallagher
INVENTOR
Charles Gardiner
BY
W. Preston Williamson
ATTORNEY

UNITED STATES PATENT OFFICE.

CHARLES GARDINER, OF PHILADELPHIA, PENNSYLVANIA.

CLEANER FOR WIND-SHIELDS FOR AUTOMOBILES, TROLLEY-CARS, AND THE LIKE.

978,013. Specification of Letters Patent. Patented Dec. 6, 1910.

Application filed December 30, 1909. Serial No. 535,697.

*To all whom it may concern:*

Be it known that I, CHARLES GARDINER, a citizen of the United States, residing at Philadelphia, in the county of Philadelphia and State of Pennsylvania, have invented a certain new and useful Improvement in Cleaners for Wind-Shields for Automobiles, Trolley-Cars, and the Like, of which the following is a specification.

My invention relates to a new and useful improvement in cleaners for wind shields for automobiles, trolley cars and the like, and has for its object to provide a simple and effective device by which the driver may readily remove sleet, snow and moisture from the glass by a single downward movement of the hand, the device returning itself to its normal position automatically.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is an elevation of a wind shield for automobiles showing my improvement applied thereto. Fig. 2, an edge view of the upper portion of the shield showing the arrangement of the mechanism. Fig. 3, a detail section of a portion of the tube containing the actuating spring, and Fig. 4, a detail view of the sliding bracket. Fig. 5, a detail of the spring arms.

In carrying out my invention, as here embodied, A represents the sliding brackets, each of which has formed therewith a squared hub B, which slides in the groove C formed in each edge of the shield, and to the ends of these brackets are pivoted the scraper arms D, at E. The scraper arms carry the scrapers F, of rubber or other suitable material, which are adapted to come in contact with the inner and outer surface of the glass and be drawn over the surface thereof.

G represents two slides, each having a slot H therein, which fits over the hub B of the sliding brackets, and these slides are connected to the scraper arms D by the spring arms I. The two slides are preferably connected together by the cross bar J, which extends across the inside of the shield and has a hand hold K by which it may be manipulated.

L is a tube having the housings M carried by the end thereof and in this tube is journaled a shaft N, to which is attached one end of the spring O, the opposite end of said spring being attached to the tube, as indicated at P. This shaft has secured thereon the pulleys R, around which the cords S are coiled, said cords being attached to the sliding brackets, as clearly shown in Fig. 2. The tube is secured to the frame of the shield in any suitable manner, and the shaft is provided with a knob T, by which the spring may be wound, so as to increase its tension.

From the foregoing description it will be seen that when it is necessary to clean the glass of the shield, the slides G are drawn downward by grasping the hand hold K, and on the first part of the downward movement of these slides the scraper arms D will be drawn inward by the spring arms I, thus bringing the scrapers F into contact with both the inner and outer surface of the glass, after which the further downward movement of the slides will carry with them the brackets A, drawing the scrapers over the surfaces of the glass and thus removing any moisture, snow or sleet which may have accumulated thereon. When the hand hold K is released, the action of the spring pulleys R will draw the slides upward, and the first portion of this upward movement will permit the spring arms to carry the scrapers out of contact with the glass, so that as they move upward to their normal elevated positions they will not smear the glass.

While I have shown my invention as applied to the wind shield of an automobile, it is obvious that without the changing of principle or construction the same may be applied to the glass fronts of trolley cars or locomotives.

Having thus fully described my invention, what I claim as new and useful, is—

1. In combination, brackets fitted to slide upon a glass wind shield, slides guided by the brackets, scraper arms pivoted to the brackets, scrapers carried by said arms, spring arms connecting the scraper arms and slides, as and for the purpose set forth.

2. In combination, brackets fitted to slide upon a wind shield, slides guided by the brackets, scraper arms pivoted to the brackets, scrapers carried by said arms, spring arms connecting the scraper arms and slides, and spring actuated pulleys connected to the brackets by cords for elevating the scrapers, as specified.

In testimony whereof, I have hereunto affixed my signature in the presence of two subscribing witnesses.

CHARLES GARDINER.

Witnesses:
 EDW. W. ANSTICE,
 S. M. GALLAGHER.